Patented June 27, 1939

2,163,679

UNITED STATES PATENT OFFICE 2,163,679

PROCESS OF COLORING ROOFING GRANULES

Henry R. Gundlach, Baltimore, Md., and Paul Teetor, Poultney, Vt., assignors to Central Commercial Company, a corporation of Illinois No Drawing. Application April 8, 1935,
Serial No. 15,288

3 Claims. (Cl. 91—70)

This invention relates to roofing material, and, more particularly, to granules having color pigment attached to the surface thereof and the method of applying the color pigment to the granules.

One of the important objects of the invention is the provision of new and improved colored granules for use on composition roofing which will not cause "blistering" when applied to the roofing material.

A further object of the invention is the provision of a new and improved colored granule and the method of making the same which is inexpenive to manufacture and that will not cause the coating to "blister" after exposure of the finished sheet to weather conditions.

Other and further objects and advantages of the invention will appear from the following description.

In manufactured composition roofing, the body of the roofing comprises a foundation felt impregnated with a weather-proofing material such as bituminous or asphaltic composition and a layer of a similar composition of a higher melting point on the exposed side of the felt in which granules are rolled or partially embedded while the coat is plastic. These granules are often colored by applying color pigment to the surface thereof by a suitable binder.

In the application of color pigment to roofing granules, various methods have been suggested. The present invention relates to that class of artificially colored granules in which the color pigment is attached to the granule by means of a binder glazed or fused onto the surface of the granule.

In fusing the binder for attaching color pigment onto the surface of granules made from more or less porous material, the temperatures have been such as to produce capillary openings or otherwise alter the structure to such an extent that the granules after application to the roofing sheet and after subsequent exposure to weather conditions, especially during the summer season, have small blisters develop in the coating.

The present invention seeks to eliminate this difficulty by a method or methods of applying the color pigment to the granules in such manner that when the granules are embedded or partially embedded in the bituminous material on the roofing felt in the manufacture of composition roofing, and the subsequent exposure to weather conditions, no blisters will be formed in this material.

As heretofore practiced, in applying color pigment to granules by fusing the binder thereon, the temperature employed is usually from 1500° to 1900° F. for a period of from 6 to 9 minutes. This high temperature for that length of time is sufficient to cause the granules, especially if of laminous material such as slate or the like, to open up slightly, whereby the asphalt binder or coating will blister after weather exposure—that is, there will be blisters formed on the surface of the coating.

It has been found that if a frit of low melting point—say, 1200° F. or less—be used as a glaze or binder for securing the pigment to the surface of the granule, blistering will not occur.

Since frit is a glassy material which does not have a definite melting point, the tendency to melt and flow is a function of temperature and time. By the use of frit of a comparatively low melting point for binding the color pigment on the granule, the temperature need be but little, if any, above the melting point of the frit if the time of passage through the kiln be increased—say to 15 or 20 minutes.

It has also been found by experiment that if granules of laminated or porous material be subjected to temperature sufficiently high to cause incipient fusion on the surface of the granule prior to applying the color pigment coat, and then fuse the color coat on the granules, there will be no blistering of the coating in subsequent use of the roofing material.

If desired, instead of first subjecting the surface of the granule to this incipient fusion and subsequently applying the color coat, these two operations may be combined with satisfactory results. This is accomplished by using a frit of relatively high melting point, as, for instance, one having a melting point not below 1800° F. The melting point of the frit should be such that the surface of the granule will be incipiently fused by the temperature employed in fusing the color coat thereon. This temperautre will vary, depending on the fusing point of the material of the granules, but in practice a temperature of 1900° F. or above is employed in fusing the color coat on the granules.

Certain color pigments, of course, could not be used in this process because of the injury to the pigment at high temperature.

In applying the color pigment to the granules by fusing the frit thereon, the frit is preferably reduced to a finely divided form and the color pigment thoroughly mixed therewith, as by means of a power mixer, or the like; the granules are moistened to cause the powder to adhere thereto, and then the whole mass is mixed together and the granules subjected to a heat treatment for fusing the frit thereon as by passing the mixture through a rotary kiln heated to the proper temperature.

It is not definitely known what causes the formation of blisters on the bituminous coat of the roofing felt but it has been observed that it occurs in connection with granules of more or less porous material.

While the following is offered more in the nature of a suggestion, it is understood that the thought is advanced merely as one possible explanation of the phenomena, but we do not desire to be bound by any theory which may be advanced herein as to the cause of blistering under certain conditions and not under others.

It has been suggested that in the process of glazing the granules at a temperature that causes a slight opening of the pores, interstices or laminations thereof that probably a slight amount of external moisture is trapped in these openings after exposure to weather and heat from the sun, the same is converted into vapor which forms blisters on the surface of the asphalt binder. Or, possibly, some air may also be trapped in the openings which on subsequent exposure to the heat of the sun may expand to assist in forming the blisters. But whatever the cause, small blisters do form in the bituminous coat of the roofing material on exposure to the weather, especially during the hot summer time. These objectionable blisters are prevented by the above method of treatment. They may also be prevented by a method that will now be described.

In the case where the temperature is high enough to cause incipient fusion of the surface of the granule during the process of applying the color pigment thereto blistering does not occur. The fused surface appears to close the granules against the collection of moisture or air therein, and, consequently, blistering is prevented.

In any event, the use of either type of frit results in a satisfactory granule for use on composition roofing and one that does not cause blistering after exposure of the roofing material.

The kiln will not only fuse the frit material on the surface of the granules but by the agitation, due to the turning of the kiln, agglomeration is prevented.

Frits are composed of various materials, but usually contain silica, lead oxide, together with one or more of the following compositions: borax, feldspar, cryolite, an oxide of sodium, potassium, calcium, or the like.

The following formulas are given as examples of frit compositions fusing at temperatures around 1200° F.:

$$\left.\begin{array}{l} 0.10\ Na_2O \\ 0.15\ K_2O \\ 0.75\ PbO \end{array}\right\} 0.15\ Al_2O_3 \left\{\begin{array}{l} 2.50\ SiO_2 \\ 0.40\ B_2O_3 \end{array}\right.$$

$$\left.\begin{array}{l} 0.30\ Na_2O \\ 0.20\ K_2O \\ 0.50\ PbO \end{array}\right\} 0.15\ Al_2O_3 \left\{\begin{array}{l} 2.55\ SiO_2 \\ 0.45\ B_2O_3 \end{array}\right.$$

$$\left.\begin{array}{l} 0.20\ Na_2O \\ 0.30\ K_2O \\ 0.50\ PbO \end{array}\right\} 0.15\ Al_2O_3 \left\{\begin{array}{l} 2.55\ SiO_2 \\ 0.45\ B_2O_3 \end{array}\right.$$

The following frit composition fuses at a temperature above 2000° F.:

$$\left.\begin{array}{l} .4\ CaO \\ .2\ K_2O \\ .4\ ZnO \end{array}\right\} .55\ Al_2O_3 \left\{3.3\ SiO_2\right.$$

While the foregoing give satisfactory results, it is understood that they are given by way of examples only, and that other well-known frits having suitable fusing points, as indicated above, may be used.

It is thought from the foregoing that my process will be apparent to those skilled in the art, and that changes therein may be made without departing from the spirit and scope of the appended claims.

We claim as our invention:

1. A method of coloring roofing granules of slate material which consists in mixing ground frit having a fusing point not below 1800° F. with ground color pigment and fusing the same onto the surfaces of the granules at sufficiently high temperature to cause incipient fusion only of the surfaces of said granules, said ground frit having color pigment incorporated therein before fusion whereby blistering of roofing material on which it is used is prevented.

2. A method of coloring roofing granules of slate material suitable for composition roofing so as to prevent subsequent blistering of the roofing material which comprises mixing ground frit and color pigments together, fusing said ground frit only on the surface of said granules at a temperature not below 1800° F. but sufficient to incipiently fuse the surface of the granules but not high enough to fuse said granules for attaching said color pigment to the surface of said granule.

3. A method of coloring roofing granules which comprises selecting a frit having a fusing point not below 1800° F., mixing a color pigment therewith, selecting roofing granules of mineral matter having surface openings which enlarge when the granules are heated to said temperature, and fusing said frit on to the surfaces of the granules at a temperature high enough to cause incipient fusion of the surfaces only of the granules, whereby the color pigment is glazed on to said surfaces and blistering of roofing material on which the granules are used is prevented.

HENRY R. GUNDLACH.
PAUL TEETOR.